(12) United States Patent
Sika

(10) Patent No.: US 10,901,493 B2
(45) Date of Patent: Jan. 26, 2021

(54) SYSTEMS AND METHODS FOR AUTONOMOUS HARDWARE COMPUTE RESILIENCY

(71) Applicant: Lucid Circuit, Inc., Santa Monica, CA (US)

(72) Inventor: Michel D Sika, Santa Monica, CA (US)

(73) Assignee: Lucid Circuit, Inc., Santa Monica, CA (US)

( * ) Notice: Subject to any disclaimer, the term of this patent is extended or adjusted under 35 U.S.C. 154(b) by 0 days.

(21) Appl. No.: 16/435,470

(22) Filed: Jun. 8, 2019

(65) Prior Publication Data

US 2019/0377403 A1 Dec. 12, 2019

Related U.S. Application Data

(60) Provisional application No. 62/683,497, filed on Jun. 11, 2018.

(51) Int. Cl.
| | | |
|---|---|---|
| *G06F 1/26* | (2006.01) | |
| *G06F 1/3293* | (2019.01) | |
| *H04L 9/32* | (2006.01) | |
| *G06N 20/00* | (2019.01) | |
| *G06F 1/20* | (2006.01) | |
| *G06F 1/3203* | (2019.01) | |

(52) U.S. Cl.
CPC ............ *G06F 1/3293* (2013.01); *G06F 1/206* (2013.01); *G06N 20/00* (2019.01); *H04L 9/3247* (2013.01); *H04L 9/3278* (2013.01); *G06F 1/3203* (2013.01)

(58) Field of Classification Search
CPC ..... G06F 1/3293; G06F 1/206; H04L 9/3278; H04L 9/3247; G06N 20/00
USPC ........................................................ 713/320
See application file for complete search history.

(56) References Cited

U.S. PATENT DOCUMENTS

| | | | |
|---|---|---|---|
| 6,871,284 B2 | 3/2005 | Cooper | |
| 2005/0151656 A1* | 7/2005 | Yuen | G01J 1/429 340/601 |
| 2006/0155840 A1 | 7/2006 | Giffin et al. | |
| 2007/0067136 A1* | 3/2007 | Conroy | G06F 1/206 702/130 |
| 2008/0005539 A1* | 1/2008 | Velhal | G06F 11/008 712/220 |
| 2009/0063122 A1* | 3/2009 | Nasle | G05B 23/0235 703/18 |
| 2009/0157740 A1 | 6/2009 | Barley | |
| 2011/0087887 A1 | 4/2011 | Luft et al. | |
| 2011/0185203 A1* | 7/2011 | Carlson | G06F 1/32 713/320 |
| 2011/0208972 A1 | 8/2011 | Liu | |
| 2013/0071085 A1 | 3/2013 | Ryman | |

(Continued)

OTHER PUBLICATIONS

Akgun et al., "Scalable Memory Fabric for Silicon Interposer-Based Multi-Core Systems", 2016 IEEE 34th International Conference on Computer Design (ICCD), pp. 33-40 (Year: 2016).

(Continued)

*Primary Examiner* — Volvick Derose
(74) *Attorney, Agent, or Firm* — Shant Tchakerian

(57) ABSTRACT

Methods and systems for providing hardware compute resiliency by using a compute fabric that includes sensors and re-programmable data processing components.

21 Claims, 3 Drawing Sheets

(56) References Cited

U.S. PATENT DOCUMENTS

| | | | |
|---|---|---|---|
| 2014/0059325 A1* | 2/2014 | Morimoto | G06F 12/0893 |
| | | | 712/42 |
| 2014/0173060 A1 | 6/2014 | Jubran et al. | |
| 2015/0026451 A1 | 1/2015 | Doerr et al. | |
| 2015/0106640 A1* | 4/2015 | Brackman | G06F 1/206 |
| | | | 713/324 |
| 2016/0062421 A1* | 3/2016 | Sugawara | G06F 1/206 |
| | | | 700/299 |
| 2016/0179680 A1* | 6/2016 | Shows | G06F 9/5016 |
| | | | 711/128 |
| 2017/0046664 A1 | 2/2017 | Haldenby | |
| 2017/0206113 A1 | 7/2017 | Krig et al. | |
| 2017/0269652 A1* | 9/2017 | Lee | G06F 1/3243 |
| 2017/0351241 A1* | 12/2017 | Bowers | G05B 19/406 |
| 2017/0373859 A1 | 12/2017 | Shors | |
| 2018/0103013 A1 | 4/2018 | Imai | |
| 2018/0284737 A1* | 10/2018 | Cella | G05B 23/024 |
| 2019/0011964 A1* | 1/2019 | Kosugi | G06F 1/206 |
| 2019/0044515 A1 | 2/2019 | Gutala et al. | |
| 2019/0188053 A1* | 6/2019 | Benke | G06F 9/5094 |

OTHER PUBLICATIONS

International Search Report and Written Opinion for PCT Application No. PCT/US2019/036190, dated Sep. 3, 2019.

Iturbe et al., "Towards a generic and adaptive System-on-Chip controller for space exploration instrumentation" In: 2015 NASA/ESA Conference on Adaptive Hardware and Systems (AHS). Jun. 18, 2015 Retrieved on Aug. 9, 2019 from trs.jpl.nasa.gov/bitstream/handle/2014/45731/15_2124_A1b.pdf.

* cited by examiner

SYSTEMS AND METHODS FOR AUTONOMOUS HARDWARE COMPUTE RESILIENCY

CROSS-REFERENCE TO RELATED APPLICATIONS

This application claims the benefit of U.S. Provisional Application Ser. No. 62/683,497, filed on 11 Jun. 2018, which is incorporated in its entirety by this reference.

TECHNICAL FIELD

This disclosure relates generally to compute resiliency, and more specifically to new and useful systems and methods for hardware compute resiliency.

BACKGROUND

In certain microelectronic systems and devices, computing is affected by environmental factors, such as radiation and heat.

DESCRIPTION OF EMBODIMENTS

Figure 1A:
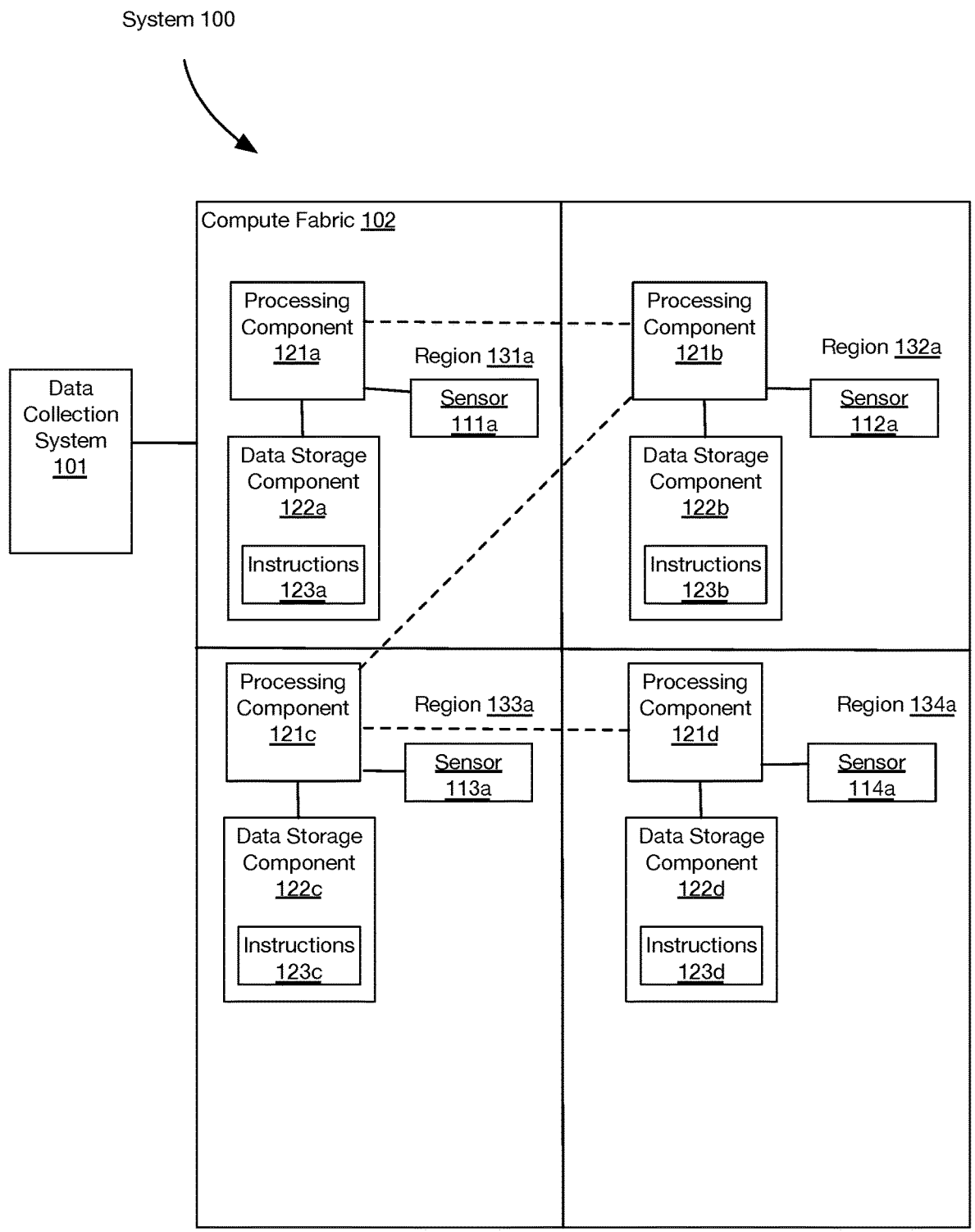
FIGS. 1A-B are schematic representations of systems, in accordance with embodiments.

The following description of embodiments is not intended to limit the disclosure to these embodiments, but rather to enable any person skilled in the art to make and use the embodiments disclosed herein. The disclosure of U.S. application Ser. No. 16/275,292 ("SYSTEMS AND METHODS FOR GENERATING IDENTITY ATTESTATIONS ATTRIBUTABLE TO INTERNALLY GENERATED DATA COLLECTED AT THE EDGE") filed on 13 Feb. 2019, and U.S. application Ser. No. 16/275,305 ("SYSTEMS AND METHODS FOR COLLECTION AND ANALYSIS AT THE EDGE") filed on 13 Feb. 2019, are hereby incorporated in their entirety by this reference.

1. Overview

High-performance computing systems ordinarily consume large amounts of power and generate large amounts of heat. On terrestrial computing systems, large power sources and active cooling systems are typically available to provide power and manage heat. However, large power sources and active cooling systems are costly for some systems, and sometimes are not an option in payload constrained smaller systems due to size, weight and power limitations. For example, some spaceborne systems, airborne systems or remote sensor systems (e.g., Low Earth Orbit satellites and drones) might have cost and/or payload limitations that restrict use of certain power sources and/or cooling systems. Therefore, processors that require less power, that generate less heat and require less support electronics are often selected for certain systems, e.g., spaceborne and other aerospace systems. However, such processors are typically much less powerful than processors typically used for high-performance computing on Earth. Moreover, typical high-performance processing systems are susceptible to space radiation, which can introduce faults. Therefore, processing systems designed for higher radiation environments (e.g., space) are often "hardened" to withstand effects of radiation.

Unfortunately, hardening results in computers that run more slowly, consume more power, have limited compute capacity for similarly sized computers and are more complex to design, requiring higher costs and taking years to develop and test. By the time a hardened processing system is available for use in harsh environments (e.g., for use in space), several generations of advanced processor designs may have been released, and the hardened processing system is often viewed as "old" with respect to conventional semiconductor capabilities. For example, typical hardened computers are based on processors fabricated in semiconductor processes that are 90 nm or larger which are at least six generations older, and such processors often run only at a fraction of the clock speed of modern processors.

Accordingly, in the case spaceborne systems, data generated or collected by spaceborne systems is typically transmitted to terrestrial terminal systems on Earth where high-performance processing is performed. For example, image data generated by an imaging satellite is typically transmitted to an Earth-based terminal where image analysis is performed. Image analysis is not typically performed on an imaging satellite, due to processing limitations.

With respect to spaceborne systems, if large amounts of data originating from space are to be analyzed, then a large amount of data is typically transmitted from space to Earth. Because of bandwidth or technical limitations on communication links between spaceborne systems and terrestrial terminal systems, data needing to be transmitted to Earth might not be able to be sent to Earth in a single communication session with a single terrestrial terminal system. Such bandwidth limitations restrict the number of spaceborne systems that can simultaneously communicate with a single terrestrial terminal system. Moreover, bandwidth or technical limitations on spaceborne transmitters and receivers may limit the number of spaceborne systems that can communicate together in a space-based network.

The inventor(s) herein have recognized that the aforementioned problems can be addressed by providing an autonomously re-programmable compute fabric that operates within an environment in which data to be processed by the compute fabric is collected (or generated). In accordance with embodiments, the compute fabric is constructed to re-program data processing compute fabric components to address environmental factors affecting processing performance, based on environment information collected by at least one environmental sensor for the environment in which the data is collected or generated.

Such an autonomously re-programmable compute fabric can provide processing (e.g., edge processing) with hardware compute resiliency, thereby allowing processing to be performed in environments otherwise affected by environmental factors (e.g., space, higher radiation environments, high thermal variation (hot or cold) environments, etc.). Such a resilient compute fabric can be co-located with (or include) data collection systems (e.g., sensors, embedded sensors, etc.) that collect (or generate) data, even if such data collection systems are located in environments in which conventional processors are likely to be impacted by environmental factors. In some embodiments, an autonomously re-programmable compute fabric is included in a data processing system along with at least one data collection system or control system (e.g., sensors, navigation, communication, data storage, etc.) (e.g., spaceborne imaging systems, spaceborne communication systems, etc.), and the compute fabric is constructed to process data collected by the data collection system in the environment in which the data is collected. By virtue of such an arrangement, processing of raw data collected by the data collection system can be performed in space to generate processing results, and the processing results can be transmitted to Earth (instead of the raw data) (or transmitted another spaceborne data processing system), thereby reducing the amount of data that needs to be transmitted to Earth, or that needs to be transmitted among spaceborne data processing systems.

Embodiments disclosed herein provide a technical solution to the aforementioned technical problems by providing a resilient hardware compute fabric (e.g., spaceborne, terrestrial, airborne) that is constructed to perform at least one data analysis process in an environment in which data is collected (or generated). By providing hardware resiliency, the raw (or pre-processed data) that is to be analyzed can be processed in a data collection environment in which the hardware compute fabric might be affected by affected by environmental factors.

Embodiments disclosed herein include an autonomously re-programmable compute fabric (e.g., 102) that is constructed to re-program data processing compute fabric components (e.g., 121a-d) to address environmental factors affecting processing performance, based on environment information collected by at least one environmental sensor (e.g., 111a-114a). Unlike a typical processor that can be powered on, off, or set to a low-power mode, selected components of the compute fabric (e.g., 121a-d) can be powered on, off, or set to a low-power mode. Moreover, compute fabric components located in an area (e.g., one of regions 131a-134a) of the compute fabric that is susceptible to environmental effects can be disabled and a new component in a different location can be programmed to perform the functionality of the disabled component. A compute fabric component located in a hot area (e.g., region 131a) of the compute fabric can be disabled and a new component in a different location (e.g., 134a) (in a cooler location) can be programmed to perform the functionality of the disabled component. A compute fabric component that is not being utilized can be disabled and power previously consumed by the disabled compute-fabric component can be diverted to a different compute fabric component. A compute fabric component located in an area of the compute fabric that is susceptible to radiation effects can be disabled and a new component in a different location (less susceptible to radiation effects) can be programmed to perform the functionality of the disabled component. Such an arrangement can provide resiliency to radiation effects, can provide improved power consumption, and can provide improved thermal management.

By virtue of improving processing performance by managing environmental effects, data analytics (which often requires increased compute performance over standard compute operations) can be performed in environments in which processing of conventional processors might be impacted by environmental factors. Compute fabrics in accordance with embodiments can enable performance of data analytics in space, thereby reducing amount of data needed to be transmitted to Earth or to other compute fabrics, thus addressing communication bandwidth limitations.

Compute Fabrics

In some embodiments, an autonomously re-programmable compute fabric (as described herein) is included in at least one data processing system. In some embodiments, the data processing system is an imaging satellite that includes sensors that operate across multiple wavelengths. In some embodiments, the data processing system is a terrestrial system requiring high reliability performance in and out of harsh environments. In some embodiments, the data processing systems is a drone or autonomous vehicle. In some embodiments, the data processing system is contained within an imaging satellite that includes sensors that operate across multiple wavelengths. In some embodiments, the data processing system is a satellite similar to an Earth observation satellite. In some embodiments, the data processing system is a space station. In some embodiments, the data processing system is contained within a space station, and the data processing system is at least one of: a Synthetic Aperture Radar (SAR), an Inverse SAR, a space rocket, a space shuttle, a lander, a rover, a space capsule, a probe, a space telescope, and the like. In some embodiments, the data processing system is a moon station. In some embodiments, the data processing system is located on a planet other than Earth.

In contrast to typical data processing system, embodiments herein include data processing system with compute fabrics constructed to perform machine learning processes in space and harsh environments that addresses environmental impact by using an environmental sensor (e.g., 111a-114a) and individually programmable data processing compute fabric components (e.g., 121a-d) (as described herein). In some embodiments, at least one of the individually programmable data processing compute fabric components (e.g., 121a-d) is constructed to collect data provided by the environmental sensor(s) (e.g., 111a-114a) and re-program at least one data processing compute fabric components based on the collected environmental data. In some embodiments, compute fabric includes at least data storage components (e.g., 122b). In some embodiments, at least one environmental sensor is communicatively (or electrically) coupled to at least one of a data processing component and a data storage component. In some embodiments, the compute fabric includes a plurality of environmental sensors.

In some embodiments, the compute fabric is communicatively coupled to an imaging device (e.g., a multi-spectral imaging device) and the compute fabric is constructed to collect raw image data by using the imaging device, process the raw image data by performing a machine learning process, and provide data generated by at least one machine learning process to a terrestrial device directly in a single communication session.

Fingerprinting and Assembling Data Packets

In some embodiments, at least one data processing compute fabric component of the compute fabric is communicatively coupled to a data storage component that includes machine-executable instructions (e.g., 123a-d) (executable by the data processing component) that when executed by the data processing component, control the data processing component to fingerprint data processed by the compute fabric. In some embodiments, the compute fabric includes instructions for a multi-tenant data analytics platform and the compute fabric system is constructed execute those instructions to sign data generated for a particular end user with information associating the data with the end user, and optionally information associated with the conditions under which data is captured, thereby providing a data attestation fingerprint.

In some embodiments, at least one data processing component of the compute fabric is programmed (via respective instructions, e.g., 123a-d, stored on a data storage component) to provide data generated by the at least one machine learning process (of the compute fabric) to the terrestrial device indirectly via one or more external data processing systems (e.g., satellites, drones, autonomous vehicles). In some embodiments, at least one data processing component of the compute fabric is programmed to generate fingerprint data for the data generated by the compute fabric, the compute fabric provides data generated by the at least one machine learning process to the terrestrial device indirectly via one or more external data processing systems (e.g., satellites). In some embodiments, the terrestrial device determines that the received data (generated by the machine learning process) is data generated by the compute fabric based on the fingerprint data. In some embodiments, the compute fabric includes instructions that control the compute fabric to break up the data generated by the at least one machine learning process into a plurality of data packets, generate fingerprint data for each data packet, and provide the data packets to the terrestrial device indirectly via one or more external data processing systems (e.g., satellites), wherein the terrestrial device identifies data packets generated by the compute fabric based on the respective fingerprint data, and combines the received data packets in accordance with a packet order identified by the fingerprint data of the plurality of packets.

In some embodiments, at least one data processing circuit component of the compute fabric (e.g., 121a-121d) is coupled to a data storage circuit component (e.g., 122a-122d) that includes processing circuit instructions (e.g., 123a-123d) for selecting at least one of a sensor (e.g., 111a-114a), a data storage circuit component (e.g., 122a-122d), and a data processing circuit component (e.g., 121a-121d) as an intrinsic properties component, and at least one data processing circuit component is coupled to a data storage circuit component that includes processing circuit instructions for generating identifying information by changing biasing and control parameters of the selected intrinsic properties component, and generating the identifying information based on the results of the changing of the biasing and control parameters. In some embodiments, fingerprinting data processed by the compute fabric includes: using tagging the data with the identifying information (or tag data generated based on the identifying information).

Sensor

In some embodiments, at least one environmental sensor (e.g., 111a-114a) is a radiation sensor described in WIPO Publication WO/2018053346, published 22 Mar. 2018. In some embodiments, at least one environmental sensor (e.g., 111a-114a) is a semiconductor process performance monitoring sensor.

In some embodiments, the one or more environmental sensors (e.g., 111a-114a) and one or more compute fabric components (e.g., data processing components, data storage components) are included in a same microelectronic device package. In some embodiments, the compute fabric is coupled to (or includes) a plurality of environmental sensors, wherein each environmental sensor is positioned proximate to a respective group of one or more compute fabric components, and constructed to sense environmental effects (e.g., heat, radiation) and generate corresponding data that is used by the compute fabric to predict environmental impact (e.g., thermal impact, radiation impact) on processing of the proximate compute fabric components. In some embodiments, environmental impact is radiation impact on processing. In some embodiments, environmental impact is thermal impact on processing. In some embodiments, environmental impact is semiconductor aging impact on compute processing effectiveness or efficiency.

Monitoring Power and Usage

In some embodiments, at least one data processing circuit component (a power monitoring compute fabric component) of the compute fabric (e.g., 121a-121d) is coupled to a data storage circuit component (e.g., 122a-122d) that includes processing circuit instructions (e.g., 123a-123d) for monitoring power consumption of each compute fabric component of the compute fabric, and at least one data processing circuit component (an activity monitoring compute fabric component) of the compute fabric (e.g., 121a-121d) is coupled to a data storage circuit component (e.g., 122a-122d) that includes processing circuit instructions (e.g., 123a-123d) for monitoring compute activity of each compute fabric component, wherein the compute fabric uses power consumption monitoring information (generated by the power monitoring compute fabric component) and compute fabric compute activity information (generated by the activity monitoring compute fabric component) to determine whether to disable a compute fabric component (e.g., data processing circuit component, data storage component) and divert power consumed by the disabled compute fabric component to a different compute fabric component.

In some embodiments, In some embodiments, at least one data processing circuit component (an activity monitoring compute fabric component) of the compute fabric (e.g., 121a-121d) is coupled to a data storage circuit component (e.g., 122a-122d) that includes processing circuit instructions (e.g., 123a-123d) for monitoring compute activity of at least one compute fabric component, wherein the compute fabric uses compute fabric compute activity information (generated by the activity monitoring compute fabric component) to determine whether to disable a compute fabric component. In some embodiments, responsive to a determination that a sensor is not generating sensor data (as determined by the activity monitoring compute fabric component), the compute fabric disables data processing components (e.g., 121-121d) that are programmed to process sensor data generated by the sensor. In some embodiments, responsive to a determination that a compute fabric component is not generating data (as determined by the activity monitoring compute fabric component), the compute fabric disables compute fabric components that are programmed to process data generated by the compute fabric component that is not generating data. In some embodiments, responsive to a determination that a compute fabric component is not processing data (as determined by the activity monitoring compute fabric component), the compute fabric disables the compute fabric component that is not processing data. In some embodiments, responsive to a determination that a compute fabric component is not generating data (as determined by the activity monitoring compute fabric component), the compute fabric disables the compute fabric component that is not generating data.

In some embodiments, the disabled compute fabric component is a data processing component that is constructed to perform a single machine learning operation. In some embodiments, the disabled compute fabric component is a data processing component that is constructed to perform an adder operation.

In some implementations, at least one data processing component (e.g., 121a-121d) includes a control input that is constructed to receive control signals from another data processing component (either directly or indirectly) via an electrically connection. In some implementations, in a case where such a data processing component is in a disabled state, responsive to receiving an "enable" control signal via the control input, the data processing component transitions to an "enabled" state. In some implementations, in a case where such a data processing component is in an "enabled" state, responsive to receiving an "disable" control signal via the control input, the data processing component transitions to a "disabled" state.

Dynamically Reprogramming Components to Improve Performance

In some embodiments, at least one data processing circuit component (a power monitoring compute fabric component) of the compute fabric (e.g., 121a-121d) is coupled to a data storage circuit component (e.g., 122a-122d) that includes processing circuit instructions (e.g., 123a-123d) for monitoring power consumption of the compute fabric, wherein the compute fabric uses compute fabric power consumption information (generated by the power monitoring compute fabric component) to determine whether to re-program at least one data processing component (e.g., 121a-121d) of the compute fabric to improve power consumption.

In some embodiments, at least one data processing circuit component (a thermal or radiation effects monitoring compute fabric component) of the compute fabric (e.g., 121a-121d) is coupled to a data storage circuit component (e.g., 122a-122d) that includes processing circuit instructions (e.g., 123a-123d) for monitoring thermal change or charge deposition change (e.g., rate at of change, acceleration of change, higher derivatives that reveal characteristics through inflection points, etc.) of the compute fabric. Based on the monitoring, the compute fabric determines whether to reprogram at least one data processing component of the compute fabric to adjust a temperature of the compute fabric (e.g., by re-programming a data processing component to reduce a thermal effect of processing by the compute fabric).

In some embodiments, monitoring thermal change includes: collecting thermal monitoring data from at least one data processing component. In some embodiments, the thermal monitoring data includes at least one of the following for the data processing component: voltage values, voltage gradient values, current values, and current gradient values. In some embodiments, the thermal monitoring data includes at least one of the following for at least one of a plurality of circuit nodes of the data processing component: voltage values, voltage gradient values, current values, and current gradient values. In some implementations, at least one data processing component is constructed to provide the thermal monitoring data to the thermal monitoring component.

By virtue of collecting thermal monitoring data from at least one data processing component of the compute fabric, thermal sensors (e.g., sensors that sense an absolute temperature) do not need to be coupled to, or embedded in, the compute fabric.

In some embodiments, alternatively or additionally, monitoring thermal change includes: collecting thermal monitoring data from at least one thermal sensor embedded in (or coupled to) the compute fabric. In some embodiments, the thermal monitoring data collected from a thermal sensor is absolute temperature. In some embodiments, the thermal monitoring data collected from a thermal sensor is relative temperature.

In some embodiments, monitoring thermal change includes: the thermal monitoring component generating thermal impact information based on the thermal monitoring data. In some implementations, the thermal impact information identifies at least one processing component whose processing impacts (or likely impacts) thermal conditions of the compute fabric.

In some implementations, the thermal monitoring compute fabric component re-programs at least one data processing component identified by the thermal impact information to reduce a thermal effect of processing. In some implementations, the thermal impact information identifies changes to be made to at least one identified data processing component.

In some implementations, the thermal monitoring component generates the thermal impact information by using a trained thermal impact machine learning model. In some embodiments, the thermal monitoring component generates the thermal impact information by performing a statistical process. In some embodiments, the thermal monitoring component generates the thermal impact information by performing a rule-based process.

In some implementations, the thermal monitoring component generates the thermal impact information by inferring thermal gradients by characterizing joule effect isoclines in a different sections of the compute fabric.

In some embodiments, at least one data processing circuit component (a performance monitoring compute fabric component) of the compute fabric (e.g., 121a-121d) is coupled to a data storage circuit component (e.g., 122a-122d) that includes processing circuit instructions (e.g., 123a-123d) for monitoring processing performance modalities of the compute fabric, wherein the compute fabric uses compute fabric processing performance information (generated by the processing performance monitoring compute fabric component) to determine whether re-program at least one data processing component of the compute fabric to increase processing speed of the compute fabric.

In some embodiments, at least one data processing component (e.g., 121a-121d) is reprogrammable. In some implementations, reprogramming a re-programmable data processing component includes: updating the instructions (e.g., 123a-c) stored in the data storage component (e.g., 122-d) that stores instructions to be executed by the data processing component.

Figure 1B:
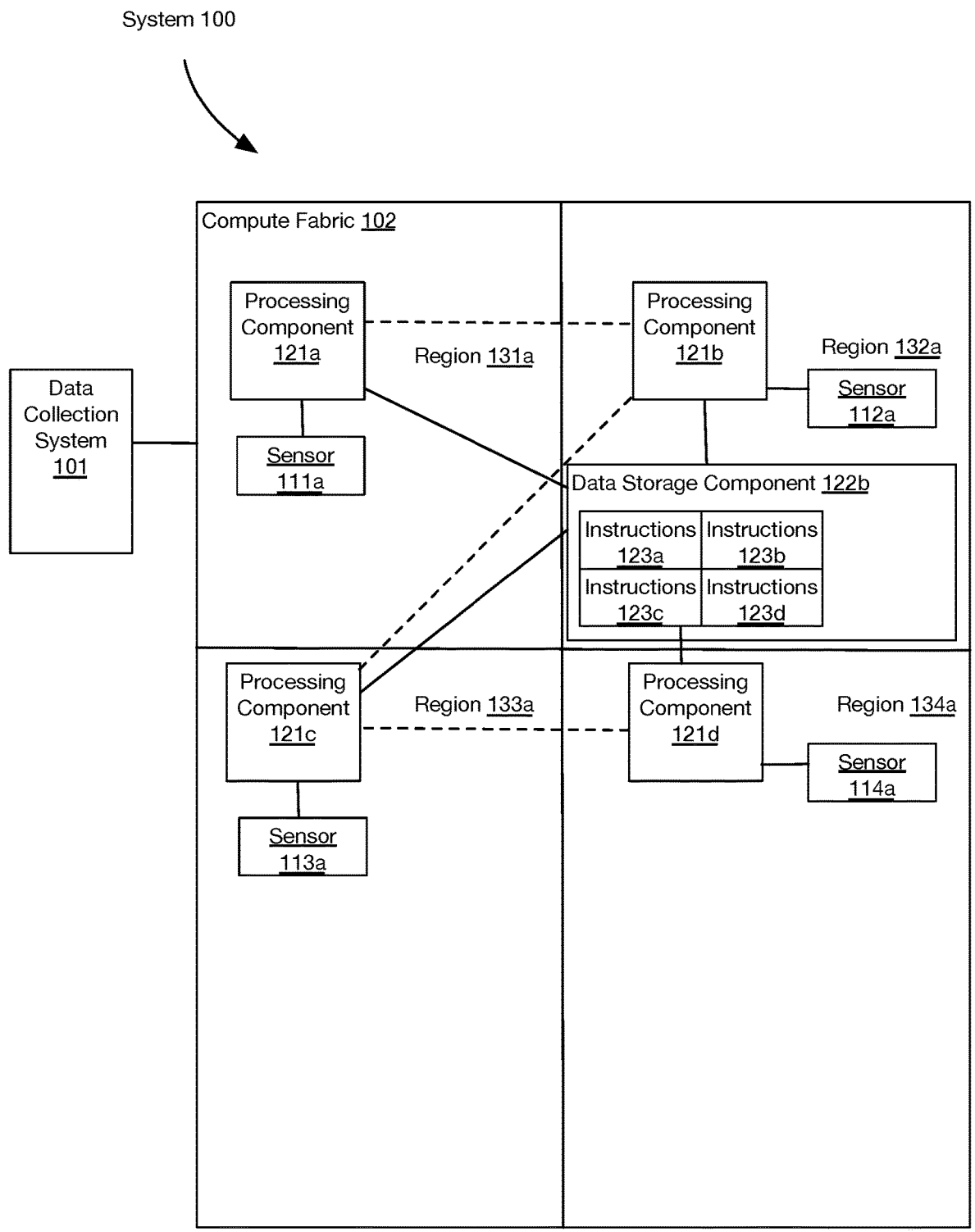

In some embodiments, the compute fabric moves processing from a first region (e.g., 131a) to a second region (e.g., 132a) by reprogramming at least one data processing component. In some implementations, in a case where a first data processing component is programmed to perform a first process in a first region (e.g., 131a), the compute fabric (e.g., a managing data processing component of the compute fabric) moving the first process a second region (e.g., 132a) includes: the compute fabric reprogramming a second data processing component (located in the second region) such that the re-programmed second data processing component is programmed to perform the first process. For example, if processing performed by the first data processing component needs to be moved from the first region (e.g., 131a) of the compute fabric 102 to the second region (e.g., 132a) that includes the second data processing component, the instructions of the first data processing component (e.g., 123a) are moved (or copied) to a storage location of the second data processing component (e.g., 123b). In a first implementation, the first data processing component is communicatively coupled (either directly via an electrical connection or indirectly via another data processing component or storage component) to a data storage component (e.g., 122b) that stores the instructions 123b of the second data processing component, and the first data processing component copies its instructions to the instruction storage location (e.g., 123b) of the second data processing component. In a second implementation, a third data processing component (a managing component) is communicatively coupled (either directly via an electrical connection or indirectly via another data processing component or storage component) to a data storage component (e.g., 122b) that stores the instructions 123b of the second data processing component and a data storage component (e.g., 122*a*) that stores instructions 123*a* of the first data processing component, and the third data processing component copies the instructions of the first data processing component (e.g., 123*a*) to the instruction storage location (e.g., 123*b*) of the second data processing component. As shown in FIG. 1A, the instructions 123*a* and 123*b* of the first and second data processing components (respectively) are stored in different storage components 122*a* and 122*b* respectively. As shown in FIG. 1B, the instructions 123*a* and 123*b* of the first and second data processing components (respectively) are stored in a same storage component 122*b*.

In some embodiments, the compute fabric 102 is configured to perform a first process by programming at least one of the data processing components to perform a respective sub-process of the first process. In some embodiments, the compute fabric 102 is reconfigured by programming at least one of the data processing components to perform a new sub-process of the first process.

In some variations, some (but not all) of the data processing components are used to perform a first process, and the compute fabric can be reconfigured by either re-programming a data processing component that is used to perform the first process, or by programming an additional data processing component (that was not previously used to perform the first process) to perform a sub-process of the first process. In some embodiments, the compute fabric 102 is configured to perform a first process by programming a strict subset of the data processing components to perform a respective sub-process of the first process. In some embodiments, the compute fabric 102 is reconfigured by programming at least one of the data processing components of the strict subset to perform a new sub-process of the first process. In some embodiments, the compute fabric 102 is reconfigured by programming at least one data processing component that is not included in the first plurality to perform a sub-process of the first process.

Radiation Sensing

In some embodiments, the compute fabric (e.g., 102) is constructed to collect sensed information from radiation sensors and identify at least a first region (e.g., 131*a*) of compute fabric components that is susceptible to radiation-induced faults. In some embodiments, the compute fabric includes data processing components (e.g., 121*a-d*) arranged in a plurality of different regions (e.g., 131*a*-134*a*) within a microelectronic device package, and includes a radiation sensor (e.g., 111*a*-114*a*) in each region, the compute fabric is constructed to collect sensed particle strike information (such as, for example, charge deposition) from each radiation sensor and identify at least a first region of compute fabric components that is susceptible to radiation-induced faults, and the compute fabric is constructed to re-program at least one data processing component of a second region (that is not susceptible to radiation-induced faults, as determined by the collected particle strike information) to perform a process of a data processing component of the first region (that is susceptible to radiation-induced faults, as determined by the collected particle strike information). In this manner, processing of a data processing component that is susceptible to radiation-induced faults is moved to another data processing component that is not susceptible to radiation-induced faults. In some embodiments, susceptibility to radiation effects is adjusted by re-programming one or more data processing component, this reduces the sensitive cross section of the compute fabric during the execution of computations. By virtue of re-programming data processing components based on collected sensor information, compute resiliency can be provided. A compute fabric that is constructed to provide compute resiliency by re-programming data processing components as described herein may provide improved power consumption as compared to a processing system that provides compute resiliency by including redundant compute fabric components.

Environment-Induced Faults

In some embodiments, the compute fabric (e.g., 102) is constructed to collect sensed information from sensors (e.g., 111*a*-114*a*) and identify at least a first region of data processing components that is susceptible to environment-induced faults or performance degradation. In some embodiments, the compute fabric includes data processing components arranged in a plurality of different regions (e.g., 131*a*-134*a*) within the compute fabric or within the microelectronic device package, and includes at least one sensor in each region, the compute fabric is constructed to collect sensed information from sensors of each region and identify at least a first region of data processing components that is susceptible to environment-induced faults, and the compute fabric is constructed to re-program at least one data processing component of a second region (that is not susceptible to environment-induced faults, as determined by the collected sensed information) to perform a process of a data processing component of the first region (that is susceptible to environment-induced faults, as determined by the collected sensed information). In this manner, processing of a data processing component that is susceptible to environment-induced faults is moved to another data processing component that is not susceptible to environment-induced faults. By virtue of re-programming data processing components based on collected sensor information, compute resiliency can be provided. A compute fabric that is constructed to provide compute resiliency by re-programming data processing components as described herein may provide improved power consumption as compared to a compute fabric that provides compute resiliency by including redundant data processing components.

By virtue of providing improved compute resiliency without including redundant data processing components, more data processing components can be used to perform machine learning processing, thereby improving overall processing performance of the compute fabric.

Thermal Effects Sensing

In some embodiments, the compute fabric (e.g., 102) is constructed to collect thermal monitoring data (as described herein) and identify at least a first region of data processing components that is susceptible to thermal-induced performance degradation.

In some embodiments, thermal monitoring is performed by using thermal sensors to generate data used to infer thermal changes, rather than measure absolute temperatures. In some embodiments, each thermal sensor is constructed to provide information used by the compute fabric to infer thermal change (e.g., rate at of change, acceleration of change, higher order characteristics, such as a 3rd derivative, etc.). In some embodiments, each thermal sensor is constructed to provide information identifying at least one of: voltage values, voltage gradient values, current values, and current gradient values.

In some embodiments, the compute fabric includes data processing components arranged in a plurality of different regions (e.g., 131*a*-134*a*) within the microelectronic device package, and includes a thermal sensor in each region, and the compute fabric is constructed to re-program at least one data processing component of a second region (that is not susceptible to thermal-induced performance degradation, as determined by information generated by at least one thermal sensor) to perform a process of a data processing component of the first region (that is susceptible to thermal-induced performance degradation, as determined by information generated by at least one thermal sensor). In this manner, processing of a data processing component that is susceptible to thermal-induced performance degradation is moved to another compute fabric component that is not susceptible to thermal-induced performance degradation. By virtue of re-programming data processing components based on collected sensor information, compute resiliency can be provided. A compute fabric that is constructed to provide compute resiliency by re-programming data processing components as described herein may provide improved power consumption as compared to a compute fabric that provides compute resiliency by including redundant data processing components.

Arrangement of Components

In some embodiments, the data processing components (e.g., 121a-d) of the compute fabric are arranged within the plurality of regions (131a-134) such that an environmental condition that is likely to cause a fault in data processing components in a first region is less likely to also cause a fault in data processing components in a second region. In some embodiments, the execution of processing tasks by data processing components are arranged (or distributed or interleaved) within the plurality of regions across the compute fabric such that a radiation particle strike that is likely to cause a fault in data processing components in a first region is less likely to also cause a fault in data processing components in a second region. In some embodiments, this approach reduces the sensitive cross section of the compute fabric when executing specific processing tasks.

In some embodiments, the execution of processing tasks within the data processing components of the compute fabric are arranged within the plurality of regions such that heat that is likely to cause a performance degradation in data processing components in a first region is less likely to also cause a performance degradation in data processing components in a second region.

In some embodiments, the execution of processing tasks within the data processing components of different regions are spaced apart or interleaved by a distance with a distribution that reduces the likelihood that an environmental condition that causes a fault in data processing components in a first region also causes a fault in data processing components in a second region. In some embodiments, the execution of processing tasks within the data processing components of different regions are spaced apart by a distance that reduces likelihood that a radiation particle strike that causes a fault in data processing components in a first region also causes a fault in data processing components in a second region. In some embodiments, the execution of processing tasks within the data processing components of different regions are spaced apart by a distance that reduces likelihood that heat that causes performance degradation in data processing components in a first region also causes a performance degradation in data processing components in a second region. In this manner, resiliency can be provided by spacing data processing components within the microelectronic device such that environmental conditions (e.g., radiation particle strikes) do not induce a fault in all data processing components that are susceptible to faults caused by environmental conditions (e.g., radiation particle strikes).

Radiation Induced Faults and Performance Degradation

In some embodiments, environment-induced faults include at least one of radiation-induced faults.

In some embodiments, a predictive model is used to identify a region (e.g., 131a-134a) (or compute fabric component) that is susceptible to environment-induced faults. In some embodiments, identifying at least a first region that is susceptible to environment-induced faults or performance degradation includes using a predictive model to identify each region that is susceptible to environment-induced faults or performance degradation. In some embodiments, the compute fabric (e.g., at least one processing component of the compute fabric) is constructed to train the predictive model by using collected sensor data (e.g., from sensors 111a-114a) and fault detection information. In some embodiments, the compute fabric is constructed to perform a fault detection or degradation susceptibility process to detect fault occurrences or degradation susceptibility in data processing components of the compute fabric, and correlate collected sensor data with a detected fault to identify a cause of the fault. In some embodiments, the compute fabric is constructed to perform a fault detection process to detect a fault occurrence in a data processing component of the compute fabric, and correlate sensor data collected in a time window that includes the time at which the fault is detected to determine whether the fault is related to an environmental condition detected by the sensor data. In some embodiments, responsive to detection of a fault, the compute fabric re-trains the model by using information of the detected fault and the correlated sensor data.

In some embodiments, identifying at least a first region of data processing components that is susceptible to environment-induced faults includes the compute fabric using a radiation-induced fault susceptibility metric of at least one data processing component to identify at least the first region.

In some embodiments, the compute fabric stores a radiation-induced fault susceptibility metric of at least one data processing component. In some embodiments, the compute fabric is constructed to generate a radiation-induced fault susceptibility metric for at least one data processing component. In some embodiments, the compute fabric is constructed to generate a radiation-induced fault susceptibility metric for at least one data processing component by using a predictive model trained by using collected sensor data. In some embodiments, the compute fabric is constructed to generate a radiation-induced fault susceptibility metric for at least one data processing component by using a predictive model trained by using collected sensor data and detected fault events. In some embodiments, based on susceptibility heuristics, the compute fabric autonomously adjusts operating parameters and performance modalities of at least one data processing compute fabric component.

Data Processing Components

In some embodiments, at least two data processing components (e.g., 121a, 121b) are constructed to perform a single machine learning operation. In some embodiments, at least two data processing components are constructed to perform an adder operation. In some embodiments, at least two data processing components each have their own instruction set (e.g., 123a, 123b). In some embodiments, the compute fabric re-programs a data processing component by updating the corresponding instruction set (e.g., 123a-d stored in corresponding data storage component).

2. Systems

FIGS. 1A and 1B show schematic representations of a system 100, according to some embodiments. In some embodiments, the system 100 includes at least one data collection system 101 and a runtime-adaptable compute fabric 102. In some embodiments, the system 100 is a microelectronic device. In some embodiments, the runtime-adaptable compute fabric 102 is included in a microelectronic device. In some embodiments, the data collection system 101 is included in a microelectronic device. In some embodiments, the runtime-adaptable compute fabric 102 and the data collection system 101 are included in different microelectronic devices. In some embodiments, the runtime-adaptable compute fabric 102 and the data collection system 101 are included a same microelectronic device. In some embodiments, the runtime-adaptable compute fabric 102 and the data collection system 101 are included a same semiconductor die. In some embodiments, the runtime-adaptable compute fabric 102 and the data collection system 101 are included different semiconductor dies that are electrically (or communicatively) coupled to each other. In some embodiments, each processing component (e.g., 121a-121d) is constructed to communicate with each other processing component of the compute fabric 102 (either directly or via at least one intermediary processing component).

In some embodiments, the runtime-adaptable compute fabric 102 is included in a single die. In some embodiments, the runtime-adaptable compute fabric 102 is included in a single die that includes a plurality of regions, each region having at least one processing component, at least one sensor (e.g., 111a-114a), and at least one data storage component (e.g., as shown in FIG. 1A). In some embodiments, at least one region includes a plurality of sensors. In some embodiments, the runtime-adaptable compute fabric 102 includes a plurality of dies, each die including a plurality of regions, each region having at least one processing component, at least one sensor (e.g., 111a-114a), and at least one data storage component (e.g., as shown in FIG. 1A), wherein the dies of the compute fabric are communicatively coupled to each other. In some embodiments, the runtime-adaptable compute fabric 102 includes a plurality of dies, each die including a plurality of regions, each region having at least one processing component, at least one sensor (e.g., 111a-114a) (e.g., as shown in FIG. 1B), and wherein the processing components are communicatively (or electrically) coupled to a data storage component that includes instructions for each data processing component, and wherein the dies of the compute fabric are communicatively coupled to each other. In some embodiments plural data processing components are coupled to a same data storage component, the data storage component including data storage locations storing instructions for each of the plural data processing components. In some embodiments, at least one processing component (e.g., 121a-d) is constructed to receive data from each sensor 111a-114a (either directly or via one or more of a data storage component and another data processing component).

In some embodiments, the runtime-adaptable compute fabric 102 includes a plurality of compute fabric components, including at least one programmable data processing circuit component (e.g., 121a-d) and at least one data storage circuit component (e.g., 122a-d). In some embodiments, the runtime-adaptable compute fabric 102 includes a plurality of compute fabric components, including at least one programmable data processing circuit component (e.g., 121a-d), at least one data storage circuit component (e.g., 122a-d) and at least one sensor (e.g., 111a, 112a, 113a, 114a). In some embodiments, each programmable data processing circuit component (e.g., 121a-d) is included in a different region (e.g., 131a, 132a, 133a, 134a) of the compute fabric 102 (e.g., a region within a semiconductor die of the compute fabric 102). In some embodiments, each region (e.g., 131a, 132a, 133a, 134a) includes at least one programmable data processing circuit component (e.g., 121a-d). In some embodiments, at least one region (e.g., 131a, 132a, 133a, 134a) includes at least two programmable data processing circuit components (e.g., 121a-d). In some embodiments, each region (e.g., 131a, 132a, 133a, 134a) includes at least one sensor (e.g., ma, 112a, 113a, 114a). In some embodiments, each programmable data processing circuit component (e.g., 121a-d) is coupled (e.g., electrically coupled, communicatively coupled) to at least one sensor (e.g., ma, 112a, 113a, 114a). In some embodiments, at least one programmable data processing circuit component (e.g., 121a-d) is coupled (e.g., electrically coupled, communicatively coupled) to at least one sensor (e.g., ma, 112a, 113a, 114a). In some embodiments, at least one data storage circuit component (e.g., 122a-d) is coupled (e.g., electrically coupled, communicatively coupled) to at least one sensor (e.g., ma, 112a, 113a, 114a).

In some embodiments, the compute fabric components of 102 are arranged on a single compute fabric die. In some embodiments, the compute fabric components of 102 are arranged on a plurality of compute fabric dies. In some embodiments, a programmable data processing circuit component (e.g., 121a) is coupled to a data storage circuit component (e.g., 122a), and the data storage circuit component includes instructions (e.g., 123a) that are executed by the data processing circuit component (e.g., 121a). In some embodiments, the programmable data processing circuit component (e.g., 121a) is re-programmed by updating the instructions (e.g., 123a). In some embodiments, the processing components are communicatively (or electrically) coupled to a data storage component that includes instructions for each data processing component (e.g., as shown in FIG. 1B).

In some embodiments, a programmable data processing circuit component (e.g., 121a) is coupled to a sensor (e.g., ma) included in the compute fabric 102. In some embodiments, a data storage circuit component (e.g., 122a) is coupled to a sensor (e.g., ma) included in the compute fabric 102.

In some embodiments, at least one data collection system (e.g., 101) is fabricated in a first semiconductor integrated circuit die, the one or more compute fabric components are fabricated in a second semiconductor integrated circuit die, and at least one data collection system of the first integrated circuit die is directly coupled to at least one compute fabric component of the second semiconductor integrated circuit die via an interface medium.

In some embodiments, a data collection system is fabricated in a first semiconductor integrated circuit die, one or more compute fabric components are fabricated in a second semiconductor integrated circuit die, the data collection system of the first integrated circuit die is directly coupled to at least one compute fabric component of the second semiconductor integrated circuit die via an interface medium, and a sensor is communicatively coupled (or electrically coupled) to the data collection system of the first semiconductor integrated circuit die.

In some embodiments, the data collection system (e.g., 101) is communicatively coupled (or electrically coupled) to at least one compute fabric component via a bridge interface medium that is external to the one or more compute fabric components, and the bridge medium is communicatively (or electrically) coupled to the one or more compute fabric component.

In some embodiments, the data collection system (e.g., 101) is electrically coupled to the compute fabric via an electric interconnect.

In some embodiments, a data collection system (e.g., 101) is electrically coupled to the compute fabric via a sensor that is coupled to the compute fabric.

In some embodiments, the compute fabric receives data from a device that is external to the compute fabric and that is electrically coupled to the compute fabric via an electric interconnect.

In some embodiments, the compute fabric receives data from a device that is external to the compute fabric and that is electrically coupled to the compute fabric via another sensor that is coupled to the compute fabric.

In some embodiments, the compute fabric is coupled to a first sensor that is constructed to receive sensor data transmitted by an external transmitter that is communicatively coupled to a data collection system that is external to the compute fabric, wherein the data collection system that is external to the compute fabric generates the data transmitted by the external transmitter.

In some embodiments, a first programmable data processing circuit component (e.g., 121*a*) is coupled to a first data storage circuit component (e.g., 122*a*) and at least a second data storage circuit component.

In some embodiments, a first programmable data processing circuit component (e.g., 121*a*) is coupled to a first data storage circuit component (e.g., 122*a*) and at least a second programmable data processing circuit component (e.g., 121*b*).

In some embodiments, a first programmable data processing circuit component (e.g., 121*a*) is coupled to at least a second programmable data processing circuit component (e.g., 121*b*).

In some embodiments, a first programmable data processing circuit component (e.g., 121*a*) is coupled to a first data storage circuit component (e.g., 122*a*), and at least a second programmable data processing circuit component (e.g., 121*b*) is also coupled to the first data storage circuit component (e.g., 122*a*).

In some embodiments, a first programmable data processing circuit component (e.g., 121*a*) is coupled to a first data storage circuit component (e.g., 122*a*), and at least a second programmable data processing circuit component (e.g., 121*b*) is also coupled to the first data storage circuit component (e.g., 122*a*) and a second data storage circuit component. In this manner, the second programmable data processing circuit component can execute instructions of the second data storage circuit component to determine whether to reprogram the first data storage circuit component by modifying the instructions stored on the first data storage circuit component.

In some embodiments, additional storage components fabricated as discrete components or organized as high bandwidth memory (HBM) in one or more separate semiconductor integrated circuit die are electrically coupled to a compute fabric semiconductor integrated die using wafer-level bonding (that includes the compute fabric 102) by way of singulated die stacking to form a 3D integrated circuit.

In some embodiments, additional storage components fabricated as discrete components or organized as high bandwidth memory (HBM) in one or more separate semiconductor integrated circuit die are electrically coupled to a compute fabric semiconductor integrated die using Through Silicon Vias (TSVs) (that includes the compute fabric 102) by way of singulated die stacking to form a 3D integrated circuit.

In some embodiments, additional storage components fabricated as discrete components or organized as high bandwidth memory (HBM) in one or more separate semiconductor integrated circuit die are electrically coupled to the compute fabric semiconductor integrated die (that includes the compute fabric 102) by way of an interface medium involving a stacked 2.5D configuration in which adjacent die are interconnected using TSVs and an interposer die is stacked atop the adjacent die.

In some embodiments, at least one sensor (e.g., 111*a*) is included in a sensor semiconductor integrated circuit die that is separate from a processing semiconductor integrated circuit die that includes a corresponding data processing component (e.g., 121*a*). In some implementations, the sensor semiconductor integrated circuit die is electrically coupled to the processing semiconductor integrated circuit die by way of an interface medium involving a stacked 2.5D configuration in which adjacent die are interconnected using TSVs and an interposer die is stacked atop the adjacent die. In some implementations, the sensor semiconductor integrated circuit die is electrically coupled to the processing semiconductor integrated circuit die by way of die stacking to form a 3D integrated circuit. In some implementations, the sensor semiconductor integrated circuit die is electrically coupled to the processing semiconductor integrated circuit by way of die stacking, as described in U.S. application Ser. No. 16/275,292 ("SYSTEMS AND METHODS FOR GENERATING IDENTITY ATTESTATIONS ATTRIBUTABLE TO INTERNALLY GENERATED DATA COLLECTED AT THE EDGE") filed on 13 Feb. 2019, and U.S. application Ser. No. 16/275,305 ("SYSTEMS AND METHODS FOR COLLECTION AND ANALYSIS AT THE EDGE") filed on 13 Feb. 2019, which are incorporated in their entirety by this reference.

In some embodiments, the compute fabric components (e.g., 121*a*-*d*, 122*a*-*d*, 111*a*-114*a*) are placed on one or more semiconductor integrated circuit dies. In some embodiments, one or more compute fabric die are electrically coupled with one or more of other compute fabric die and storage component specific die.

In some embodiments, the data collection system 101 includes a sensor constructed to measure voltage and a circuit constructed to measure current.

In some embodiments, the data collection system 101 includes a sensor constructed to measure electromagnetic waves.

In some embodiments, the data collection system 101 includes a sensor constructed to measure magnetic waves.

In some embodiments, the data collection system 101 includes a sensor constructed to measure temperature.

In some embodiments, the data collection system 101 includes an image sensing system (e.g., an image sensor). In some embodiments, the data collection system 101 is communicatively coupled to an image sensing system (e.g., an image sensor).

In some embodiments, the data collection system 101 includes a communication system. In some embodiments, the data collection system 101 is communicatively coupled to a communication system.

In some embodiments, the sensors (e.g., 111*a*-114*a*) include at least one of a temperature sensor, a thermal sensor, an altitude sensor, an electrostatic discharge (ESD) sensor, a tamper detection sensor, a location sensor, a position sensor, an inertial measurement unit (IMU), a gyroscope, a radiation sensor. In some embodiments, at least one radiation sensor is a radiation sensor described in WIPO Publication WO/2018053346, published 22 Mar. 2018.

In some embodiments, each region (e.g., 131*a*-134*a*) includes a radiation sensor. In some embodiments, each region (e.g., 131*a*-134*a*) includes a radiation sensor similar to the radiation sensor described in WIPO Publication WO/2018053346, published 22 Mar. 2018.

In some embodiments, individual data processing components (programmable data processing circuit component) (e.g., 121a-121d) are directly and individually programmed for different functions depending on the roles attributed to the component during program instruction execution. In some embodiments, each programmable data processing circuit component (e.g., 121a-121d) is electrically coupled to at least one data storage circuit component (e.g., 122a-122d) that includes machine-executable program instructions (e.g., 123a-123d) that are executable by the programmable data processing circuit component, and wherein each programmable data processing circuit component is programmed by storing program instructions at the storage circuit component electrically coupled to the data processing circuit component.

In some embodiments, roles include at least one of: "data collection", "data integration", "analysis", "learning", "intrinsic properties", "profiling", "monitoring", "data fusion", "data attestation". In some embodiments, roles include at least one of "power monitoring", "compute fabric activity monitoring", "resiliency management".

In some embodiments, roles include "security".

In some embodiments, the role of a data processing component (e.g., 121a-121d) is determined by the instructions (e.g., 123a-123d) stored for the data processing component (e.g., at 122a-122d).

In some embodiments, in a data collecting role, functions include commands for enabling and disabling the collection of data from sensor components. Data collecting role functions include commands for configuring sensor component operating properties such as sensor sensitivity, dynamic operating range, biasing conditions.

In some embodiments, in a data integration role, functions include algorithm specific calculations, data retrieval and data storage commands aimed at combining data captured from sensor components by processing and storage components in data collecting roles. Functions in the data collection role also include commands to configure the functionality of components in the data collection role.

In some embodiments, in an analysis role, processing and storage elements perform signal processing or error correction specific calculations along with associated data retrieval and data storage commands for preprocessing data in preparation of applying machine learning techniques. Examples of analysis include data sampling, time or spectral based filtering, recovery of corrupted sensor data. Functions in the analysis role also include commands to configure the functionality of components in the data integration role.

In some embodiments, processing and storage components in the learning role are programmed with functions for implementing calculations, data retrieval and storage as defined to the applicable algorithms. Functions include commands for interfacing with components in the analysis role in order to retrieve data from said components. Functions include commands to configure the functionality of components in the analysis role. Functions include calculation, data retrieval and data storage commands necessary for the implementation of well-known machine learning algorithms such as statistical classification, statistical spectral density estimation, clustering, principal component analysis, independent component analysis, singular value decomposition, learning classifiers, kernel estimators.

In some embodiments, in the "intrinsic properties" role, processing components execute commands designed to place discrete processing, storage and sensor components in a maintenance mode and where certain biasing and control parameters of the components in the maintenance mode are continuously changed in order to heuristically collect information pertinent to the unique intrinsic physical specificities of each discrete component being exercised. These specificities are related to semiconductor process variations that occur naturally during manufacturing.

In some embodiments, the intrinsic physical specificities of discrete sensor components are used to calibrate individual sensor components.

In some embodiments, individual intrinsic physical specificities are combined to calibrate groups of sensor components.

In some embodiments, the intrinsic physical specificities of components are applied to security and cryptography applications.

In some embodiments, the intrinsic physical specificities of components are applied to authorization and authentication applications.

In a profiling role, functions include at least one of capturing and aggregation of statistical heuristic information pertinent to data in order to generate analytics (characteristic information summaries) for the purpose of characterizing data quality, detecting and learning data characteristic outliers/aberrations, classification of risk modalities, predicting failure probabilities, predicting failure modalities, and learning/identifying new modalities pertinent to data.

In a monitoring role, functions include comparing data characteristics against expected behavior profiles under defined operating/environmental paradigms.

In a data fusion role, functions include combining data from heterogeneous sources/sensors in order to create multimodal information by using application/data dependent statistical learning processes. Such information is produced by leveraging machine learning techniques to extract characteristic information from data/sensor sources that renders information properties of interest salient for the purpose of profiling, analysis, analytics extraction, attestation, and the like.

In a data attestation role, functions include at least one of tagging data and verifying existing embedded data tags in order to verify at least one of: authenticity (not tampered with), completeness (is any data missing), traceability (verifiable ledger of hops and/or path has data taken before getting here), authentication (source/transmitter validation and/or recipient validation), authorization (sender/recipient permission/credentials verification for data transfer), accountability (deterministic traceability—is the traceability ledger correct/acceptable/match the expected path?), and provide data forensic information.

In some embodiments, in the "power monitoring" role, a data processing component executes instructions for: monitoring power consumption of the compute fabric (as described herein). In some implementations, the data processing component in the "power monitoring role" uses the monitored power consumption information to determine whether to disable a compute fabric component (e.g., data processing circuit component, data storage component, sensor) and divert power consumed by the disabled compute fabric component to a different compute fabric component.

In some embodiments, in the "compute fabric activity monitoring" role, a data processing component executes instructions for: monitoring compute activity of the compute fabric (as described herein). In some implementations, the data processing component in the "compute fabric activity monitoring" uses the monitored compute activity information to determine whether to disable a compute fabric component (e.g., data processing circuit component, data storage component, sensor) and divert power consumed by the disabled compute fabric component to a different compute fabric component.

In some embodiments, in the "resiliency management" role, a data processing component executes instructions for: collecting sensed particle strike information from each radiation sensor, identifying at least a first region (e.g., 131a-134a) of compute fabric components that is susceptible to radiation-induced faults, and re-programming at least one data processing component of a second region (that is not susceptible to radiation-induced faults, as determined by the collected particle strike information) to perform a process of a data processing component of the first region (that is susceptible to radiation-induced faults, as determined by the collected particle strike information), as described herein.

In some embodiments, in the "resiliency management" role, a data processing component executes instructions for: collecting sensed particle strike information from each radiation sensor, identifying data processing components (e.g., 121a-d) of at least a first region that are susceptible to radiation-induced faults, and re-programming at least one data processing component (that is not susceptible to radiation-induced faults, as determined by the collected particle strike information) (and that is included in a second region) to perform a process of an identified data processing component (that is susceptible to radiation-induced faults, as determined by the collected particle strike information) (and that is included in the first region), as described herein.

In some embodiments, in the "resiliency management" role, a data processing component executes instructions for: collecting thermal monitoring data (as described herein), identifying at least a first region (e.g., 131a-134a) of compute fabric components that is susceptible to thermal-induced faults, and re-programming at least one data processing component of a second region (that is not susceptible to thermal-induced faults, as determined by the collected thermal monitoring data) to perform a process of a data processing component of the first region (that is susceptible to thermal-induced faults, as determined by the collected thermal monitoring data), as described herein. In some embodiments, the compute fabric determines that a region is susceptible to thermal-induced faults based on a comparison of thermal monitoring data collected for the region to at least one threshold value. In some embodiments, the compute fabric determines that a region is susceptible to thermal-induced faults by processing at least data collected for the region by using a trained machine learning model.

In some embodiments, in the "resiliency management" role, a data processing component executes instructions for: identifying at least a first data processing component (e.g., 121a-d) that has a temperature that exceeds a threshold temperature value, and re-programming (as described herein) at least one data processing component (whose temperature value is below the threshold temperature value) to perform a process of the first data processing.

In some embodiments, the compute fabric includes a data transmitter system. In some embodiments, the compute fabric is coupled to a data transmitter system. In some embodiments, the data transmitter system is constructed to transmit data to at least one of an external compute fabric, a spaceborne system, an aerospace system, and a terrestrial terminal system. In some embodiments, the compute fabric includes a data receiver system. In some embodiments, the compute fabric is coupled to a data receiver system. In some embodiments, the data receiver system is constructed to receive data from at least one of an external compute fabric, a spaceborne system, an aerospace system, and a terrestrial terminal system. In some embodiments, the data transmitter system and the data receiver system are included in a transceiver system.

In some embodiments, the compute fabric is communicatively coupled to an external compute fabric.

In some embodiments, the compute fabric is communicatively coupled to an external sensor.

In some embodiments, the data collection system includes a compute fabric similar to the compute fabric 102. In some embodiments, the data collection system includes a sensor constructed to generate data processed by the compute fabric 102.

In some embodiments, the data collection system is communicatively coupled to one or more compute fabrics located in another satellite, space vehicle, aerospace platform, drone, autonomous vehicle, compute system, and the like.

In some embodiments, the data collection system is communicatively coupled to one or more sensors located in another satellite, space vehicle, aerospace platform, drone, autonomous vehicle, compute system, and the like.

2. Methods

Figure 2:
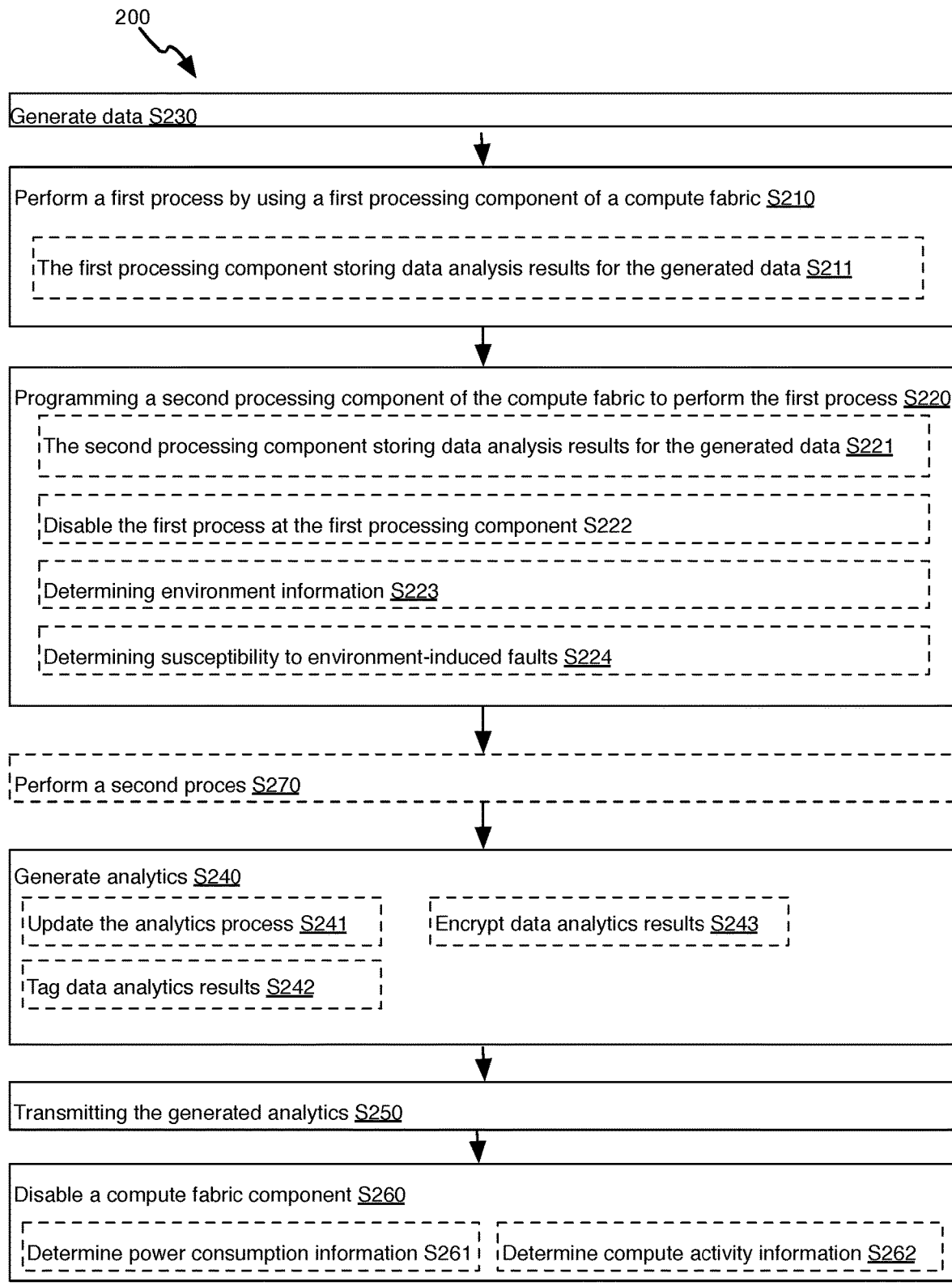
FIG. 2 is flowchart representation of a method, in accordance with embodiments.

FIG. 2 is a flowchart representation of a method 200. In some embodiments, the method 200 is performed by a compute fabric that includes re-programmable data processing components and sensors (e.g., 102 shown in FIG. 1A, 102 shown in FIG. 1B). In some embodiments, the method 200 is performed by a spaceborne system (e.g., satellite, space station, spacecraft, etc.) that includes a compute fabric that includes re-programmable data processing components and sensors (e.g., 102 shown in FIG. 1A, 102 shown in FIG. 1B). In some embodiments, the method 200 is performed by an aerospace system (e.g., aircraft, drone, etc.) that includes a compute fabric that includes re-programmable data processing components and sensors (e.g., 102 shown in FIG. 1A, 102 shown in FIG. 1B). In some embodiments, the method 200 is performed by a microelectronic device (e.g., 100) that includes at least a first data processing component (e.g., 121a, 121b, 121C, 121d) and a second data processing component (e.g., 121a, 121b, 121C, 121d) arranged at different regions (e.g., 131a, 132a, 133a, 134a) within a microelectronic device package of the microelectronic device, and include at least a first sensor (e.g., ma, 112a, 113a, 114a).

In some embodiments, a method 200 includes: performing a first process by using a first processing component (e.g., 121a) of a compute fabric S210; and programming a second processing component (e.g., 121b) of the compute fabric to perform the first process S220.

In some embodiments, S220 includes: programming the second processing component to perform the first process based on at least one of: sensor information generated by using at least one sensor (e.g., 111a-114a) included in the compute fabric; power consumption information generated by the compute fabric; processing performance information for the data analysis process generated by the compute fabric; and fault detection information for the data analysis process generated by the compute fabric.

The method 200 can include: a data collection system (e.g., 101) generating data (e.g., image data, communication data, sensor data, etc.) S230. In some embodiments, the first process is a data analysis process that is applied to the generated data. In some embodiments, the first process is a sub-process of a data analysis process that is applied to the generated data. In some embodiments, the data collection system is an image sensor system that is constructed to generate image data, the data analysis process is an image analysis process, and the image analysis process includes at least one machine-learning sub-process.

S210 can include: the first processing component storing results of the first process at the compute fabric (e.g., in a storage component (e.g., 122*a-d*) S211. In some embodiments S211 includes the first processing component storing data analysis results generated by the first processing component by performing the first process for the generated data.

In some embodiments, at least one of the first processing component, the second data processing component, and a third processing component of the compute fabric performs S220.

S220 can include: the second processing component storing results of the first process at the compute fabric (e.g., in a storage component (e.g., 122*a-d*) S221. In some embodiments S221 includes the second processing component storing data analysis results generated by the second processing component by performing the first process for the generated data S221.

S220 can include: disabling the first process at the first processing component S222. In some embodiment, disabling the first process at the first processing component includes reprogramming the first processing component to disable the first process.

The method 200 can include: at least one processing component of the compute fabric generating data analytics S240. In some embodiment, S240 includes (at least one processing component) performing an analytics process. In some embodiments, the analytics process includes the first process (of S210 and S220). In some embodiments, the analytics process includes the a plurality of sub-processes (e.g., the first process of S210 and S220 and the second process of S270). In some embodiments, S240 includes generating analytics results by using the stored results of the first process generated by the first processing component and the stored results of the first process generated by the second processing component.

S240 can include S241.

S241 functions to update the analytics process performed at S240. In some embodiments, S241 includes updating the analytics process based on at least one of power consumption information generated by the compute fabric, processing performance information for the data analysis process generated by the compute fabric, fault detection information for the data analysis process generated by the compute fabric, sensor activity information (e.g., information indicating whether the data collection system is generating data) of the data collection system generated by the compute fabric, and processing activity information of the processing components generated by the compute fabric, as described herein.

S241 can include updating the analytics process by replacing the first process with a second process. S241 can include updating the analytics process by programming at least one processing component to perform a new sub-process (e.g., by updating instructions of the processing component). In a case where the data analytics process includes a plurality of process, S241 can include updating the analytics process by disabling at least one of the processes (e.g., by updating instructions of at least one processing component).

In some embodiments, S241 includes: a processing component dynamically reconfiguring the compute fabric to improve power consumption while performing the data analysis process, based on compute fabric power consumption information generated by a power monitoring compute fabric component.

In some embodiments, S241 includes: a processing component dynamically reconfiguring the compute fabric to reduce temperature of the compute fabric while performing the data analysis process, based on compute fabric temperature information generated by a temperature monitoring compute fabric component.

In some embodiments, S241 includes: a processing component dynamically reconfiguring the compute fabric to increase processing speed of the compute fabric while performing the data analysis process, based on compute fabric processing speed information generated by a processing speed monitoring compute fabric component.

In some embodiments, S241 includes: a processing component dynamically reconfiguring the compute fabric to reduce effects of environment-induced faults on the compute fabric while performing the data analysis process, based on a fault information generated by a fault resiliency compute fabric component. In some embodiments, environment-induced faults include radiation-induced faults, and the fault information includes radiation susceptibility information.

In some embodiments, dynamically reconfiguring the compute fabric includes at least one of: programming, re-programming, disabling, and enabling a processing component (e.g., 121*a-d*) of the compute fabric (e.g., 102).

In some embodiments, the data analysis process is partitioned into a first plurality of sub-processes, and wherein each of a first plurality of processing components of the compute fabric performs a respective one of the first plurality of sub-processes of the data analysis process. In some embodiments, S241 includes: a processing component re-partitioning the data analysis process into a second plurality of sub-processes based on at least one of the power consumption information generated by the compute fabric, processing performance information for the data analysis process generated by the compute fabric, fault detection information for the data analysis process generated by the compute fabric, sensor activity information generated by the compute fabric, activity information of the data collection system generated by the compute fabric, and processing activity information of the processing components generated by the compute fabric. In some embodiments, the compute fabric (e.g., a processing component of the compute fabric) reprograms at least one processing component during processing of the data analysis process such that each of a second plurality of processing components of the compute fabric performs a respective one of the second plurality of sub-processes of the data analysis process.

S240 can include S242.

S242 includes: tagging the data analytics results with identifying information unique to intrinsic physical specificities of at least one of the data collection system (e.g., 101) and the compute fabric (e.g., 102). In some embodiments, the identifying information is a Physically Unclonable Function (PUF). In some embodiments, the identifying information is used to generate a Physically Unclonable Function (PUF). In some embodiments, the compute fabric tags the data analytics results with information identifying an intended recipient of the analytics results. In some embodiments, the compute fabric uses the identifying information to generate a digital signature, and signs the analytics results with the generated digital signature.

S240 can include S243.

S243 functions to encrypt the analytics results with a public key of an intended recipient of the analytics data.

The method 200 can include: a data transmitter system of the compute fabric transmitting the generated data analytics results (generated at S240) to at least one external system S250. In some embodiments, at least one external system includes a terrestrial terminal system. In some embodiments, at least one external system includes an external compute fabric. In some embodiments, at least one external system includes an external spaceborne system. In some embodiments, at least one external system includes an external aerospace system.

In some embodiments, the data transmitter system is included in a transceiver system of the compute fabric.

In some embodiments, the process of the first data processing component is at least one of a data collection process, data integration process, analysis process, machine learning process, intrinsic properties process, the process S210, and the process S220.

In some embodiments, the first process is a process of at least one of the following roles: "data collection", "data integration", "analysis", "learning", "intrinsic properties", "profiling", "monitoring", "data fusion", "data attestation", "power monitoring", "compute fabric activity monitoring", "resiliency management", as described herein.

In some embodiments, the second processing component is included in a second region (e.g., 132a) that is different from a first region (131a) that includes the first processing component.

In some embodiments, the third data processing component is included in the first region. In some embodiments, the third data processing component is included in the second region that includes the second data processing component. In some embodiments, the third data processing component is included in a different third region.

S220 can include S223.

S223 functions to determine environment information, wherein S220 functions to program the second processing component of the compute fabric to perform the first process based on the environment information determined at S223. In some embodiments, S223 functions to determine environment information by using information (e.g., voltage information, current information) collected from at least one processing component (e.g., 121a-d) of the compute fabric (e.g., 102). In some embodiments, a first processing component (e.g., 121a) located in a first region (e.g., 131a) generates first environment information. In some embodiments, a second processing component (e.g., 121a) located in a second region (e.g., 131a) generates second environment information.

In some embodiments, S223 functions to determine environment information by using at least one sensor (e.g., 111a-114a) of the compute fabric (e.g., 102). In some embodiments, the sensor is a radiation sensor, and the environment information is radiation information. In some embodiments, the sensor is a temperature sensor, and the environment information is temperature information. In some embodiments, the sensor is a thermal sensor, and the environment information is thermal information. In some embodiments, a first sensor (e.g., ma) located in a first region (e.g., 131a) that includes the first processing component (e.g., 121a) generates first environment information. In some embodiments, a second sensor (e.g., nib) located in a second region (e.g., 131a) that includes the second processing component (e.g., 121a) generates second environment information.

S220 can include: a processing component of the compute fabric programming the second processing component during performance of a process of the "resiliency management" role by using the environment information determined at S223, as described herein. S220 can include S224.

S224 functions to a identify a region (or component) that is susceptible to environment-induced faults (e.g., radiation-induced faults, thermal-induced faults), as described herein.

The method S200 can include S260.

S260 functions to disable a compute fabric component (e.g., processing component, storage component, sensor, etc.).

In some embodiments, S260 includes: the compute fabric disabling a processing component responsive to a determination that the processing component is not generating data.

In some embodiments, S260 includes: the compute fabric disabling a processing component, responsive to a determination that a sensor communicatively coupled to the processing component is not generating sensor data.

In some embodiments, S260 includes determining power consumption information (S261) by performing a process of the "power monitoring role", and determining whether to disable a compute fabric component (e.g., data processing circuit component, data storage component) and diverting power consumed by the disabled compute fabric component to a different compute fabric component.

In some embodiments, S260 includes determining compute activity of the compute fabric (S262) by performing a process of the "compute fabric activity monitoring" role, and determining whether to disable a compute fabric component (e.g., data processing circuit component, data storage component) and diverting power consumed by the disabled compute fabric component to a different compute fabric component.

The method 200 can includes S270, which includes performing a second process. In some embodiments, the first process and the second process are sub-processes of a main process (e.g., sub-processes of a data analysis process). In some embodiments, the first process and the second process are performed by different processing components (e.g., 121a-d) of the compute fabric. In some embodiments, at least one processing component (e.g., 121a-d) of the compute fabric performs both the first and second processes. In some embodiments, S240 includes: generating data analytics results by using the stored results of the first process and the second process. In some embodiments, S240 includes: generating data analytics results by using the stored results of the first process generated by the first processing component, the stored results of the first process generated by the second processing component, and stored results of the second process (generated by a processing component of the compute fabric).

In some embodiments, at least one sensor of the compute fabric (e.g., 111a-114a) is a radiation sensor that functions to collect particle strike information, and S224 includes determining susceptibility of region or compute fabric component to radiation-induced faults by using the particle strike information, as described herein.

In some embodiments, environment-induced faults described herein with respect to method 200 include at least one of radiation-induced faults, thermal-induced faults, ESD-induced faults, tamper-induced faults, altitude-induced faults, and location-induced faults.

What is claimed is:

1. A method for controlling a system that includes a data collection system, at least one radiation sensor, and a hardware compute fabric, the method comprising:
   the data collection system generating data;
   a first processing component of the compute fabric performing a first sub-process of a data analysis process for the generated data and storing results of the first sub-process at the compute fabric;
a third processing component programming a second processing component of the compute fabric to perform the first sub-process and disabling the first sub-process at the first processing component, based on environment particle strike information generated by using the at least one radiation sensor;
the second processing component performing the first sub-process for the generated data and storing results of the first sub-process generated by the second processing component at the compute fabric;
the compute fabric generating data analytics results by using the stored results of the first sub-process generated by the first processing component and the stored results of the first sub-process generated by the second processing component; and
a data transmitter system of the compute fabric transmitting the generated data analytics results to at least one of a terrestrial terminal system and an external second compute fabric
wherein the third processing component dynamically reconfigures the compute fabric to improve power consumption while performing the data analysis process, based on compute fabric power consumption information generated by a power monitoring compute fabric component.

2. The method of claim 1, further comprising:
the at least one radiation sensor generating the environment particle strike information for at least a first region of a microelectronic device package that includes the first processing component and a second region of the microelectronic device that includes the second processing component.

3. The method of claim 2,
further comprising the third processing component determining that compute performance of the first processing component is susceptible to environmental impact and that the second region is less susceptible to environmental impact than the first region based on the generated environment particle strike information,
wherein the third processing component programs the second processing component to perform the first sub-process and disables the first sub-process at the first processing component responsive to the determination that compute performance of the first processing component is susceptible to environmental impact and that the second region is less susceptible to environmental impact than the first region.

4. The method of claim 1, further comprising:
a fourth processing component of the compute fabric performing a second sub-process of the data analysis process for the generated data and storing results of the second sub-process at the compute fabric,
wherein the compute fabric generates the data analytics results by using the stored results of the first sub-process generated by the first processing component, the stored results of the first sub-process generated by the second processing component, and the stored results of the second sub-process generated by the fourth processing component.

5. The method of claim 4, further comprising:
the third processing component programming the fourth processing component to perform a third sub-process of the data analysis process and disabling the second sub-process at the fourth processing component, based on at least one of power consumption information generated by the compute fabric, processing performance information for the data analysis process generated by the compute fabric, fault detection information for the data analysis process generated by the compute fabric, sensor activity information of an image sensor system generated by the compute fabric, and processing activity information of the processing components generated by the compute fabric,
wherein the compute fabric generates the data analytics results by using the stored results of the first sub-process generated by the first processing component, the stored results of the first sub-process generated by the second processing component, the stored results of the second sub-process generated by the fourth processing component, and the stored results of the third sub-process generated by the fourth processing component.

6. The method of claim 4, further comprising:
the third processing component disabling the second sub-process at the fourth processing component, based on at least one of power consumption information generated by the compute fabric, processing performance information for the data analysis process generated by the compute fabric, fault detection information for the data analysis process generated by the compute fabric, sensor activity information of an image sensor system generated by the compute fabric, and processing activity information of the processing components generated by the compute fabric.

7. The method of claim 1, wherein the data collection system is an image sensor system that is constructed to generate image data, wherein the data analysis process is an image analysis process, and wherein the image analysis process includes at least one machine learning sub-process.

8. The method of claim 1, wherein the compute fabric tags the data analytics results with identifying information unique to intrinsic physical specificities of at least one of the at least one sensor and the compute fabric.

9. The method of claim 8, wherein the identifying information is a Physically Unclonable Function (PUF).

10. The method of claim 8, wherein the identifying information is used to generate a Physically Unclonable Function (PUF).

11. The method of claim 8, wherein the compute fabric tags the data analytics results with information identifying an intended recipient of the analytics results.

12. The method of claim 8, wherein the compute fabric uses the identifying information to generate a digital signature, and signs the analytics results with the generated digital signature.

13. The method of claim 8, wherein the compute fabric encrypts the analytics results with a public key of an intended recipient of the analytics results.

14. The method of claim 8, wherein the compute fabric generates semiconductor process performance characteristic identifying information.

15. The method of claim 1, wherein the compute fabric disables the first processing component responsive to a determination that the first processing component is not generating data.

16. The method of claim 1, wherein the compute fabric disables the first processing component, responsive to a determination that a sensor communicatively coupled to the first processing component is not generating sensor data.

17. The method of claim 1,
wherein the third processing component dynamically reconfigures the compute fabric to reduce temperature of the compute fabric while performing the data analysis process, based on compute fabric temperature information generated by a temperature monitoring compute fabric component.

18. The method of claim 1,
wherein the third processing component dynamically reconfigures the compute fabric to increase processing speed of the compute fabric while performing the data analysis process, based on compute fabric processing speed information generated by a processing speed monitoring compute fabric component.

19. The method of claim 1, wherein the data analysis process is partitioned into a first plurality of sub-processes, and wherein each of a first plurality of processing components of the compute fabric performs a respective one of the first plurality of sub-processes of the data analysis process.

20. The method of claim 19,
wherein the third processing component re-partitions the data analysis process into a second plurality of sub-processes based on at least one of power consumption information generated by the compute fabric, processing performance information for the data analysis process generated by the compute fabric, fault detection information for the data analysis process generated by the compute fabric, sensor activity information of an image sensor system generated by the compute fabric, and processing activity information of the processing components generated by the compute fabric, and
wherein the third processing component reprograms at least one processing component during processing of the data analysis process such that each of a second plurality of processing components of the compute fabric performs a respective one of the second plurality of sub-processes of the data analysis process.

21. The method of claim 19,
wherein the third processing component re-distributes the data analysis process into a second plurality of sub-processes based on at least one of power consumption information generated by the compute fabric, processing performance information for the data analysis process generated by the compute fabric, fault detection information for the data analysis process generated by the compute fabric, sensor activity information of an image sensor system generated by the compute fabric, and processing activity information of the processing components generated by the compute fabric, and
wherein the third processing component reprograms at least one processing component during processing of the data analysis process such that each of a second plurality of processing components of the compute fabric performs a respective one of the second plurality of sub-processes of the data analysis process.

* * * * *